(12) United States Patent
Clark

(10) Patent No.: US 10,384,735 B2
(45) Date of Patent: Aug. 20, 2019

(54) BIKE HANGER SYSTEM AND METHOD

(71) Applicant: Deryk Clark, Toronto (CA)

(72) Inventor: Deryk Clark, Toronto (CA)

( * ) Notice: Subject to any disclaimer, the term of this patent is extended or adjusted under 35 U.S.C. 154(b) by 0 days.

(21) Appl. No.: 15/862,882

(22) Filed: Jan. 5, 2018

(65) Prior Publication Data

US 2019/0210675 A1      Jul. 11, 2019

(51) Int. Cl.
*B62H 3/12*      (2006.01)
*B62H 5/00*      (2006.01)
*B62H 3/00*      (2006.01)

(52) U.S. Cl.
CPC ................. *B62H 3/12* (2013.01); *B62H 3/00* (2013.01); *B62H 5/003* (2013.01)

(58) Field of Classification Search
CPC ... B62H 3/12; B62H 3/00; B62H 3/04; B62H 5/003; A47F 5/0892; A47F 10/04; A47F 5/0006; A47F 5/0876; A47F 5/0884; A47F 5/0807; A47B 46/00; A47B 81/00; A47B 96/067; B60R 9/10; F16M 11/048
USPC ............. 211/17–20, 23, 113, 118, 151, 162, 211/94.02, 94.01, 5, 22, 86.01, 87.01; 248/317, 323, 339, 340
See application file for complete search history.

(56) References Cited

U.S. PATENT DOCUMENTS

| | | | |
|---|---|---|---|
| 2,975,949 A | 3/1961 | Lutsky | |
| 3,782,559 A | 1/1974 | Wright | |
| 3,881,680 A * | 5/1975 | Lietaert, Jr. | E05B 71/00 211/5 |
| 3,924,751 A | 12/1975 | Ballenger | |
| 3,973,504 A * | 8/1976 | Knudsen | B61B 10/02 104/172.4 |
| 4,025,014 A * | 5/1977 | Larson | E05B 73/0005 248/552 |
| 4,738,369 A * | 4/1988 | Desjardins | F16M 11/28 211/113 |
| 4,846,249 A * | 7/1989 | Cooper | A47H 15/02 160/345 |
| 5,082,120 A * | 1/1992 | Vega | B62H 3/12 211/17 |
| 5,092,504 A * | 3/1992 | Hannes | B60R 9/00 211/17 |
| 5,165,647 A * | 11/1992 | Ribeiro | A61M 5/1415 248/323 |
| 5,402,979 A | 4/1995 | Bellamy | |
| 5,460,274 A * | 10/1995 | Kramer | B62H 3/12 211/17 |
| 5,794,793 A | 8/1998 | Frederick | |
| 6,095,344 A | 8/2000 | White | |
| 6,131,866 A * | 10/2000 | Kesinger | A47B 96/067 211/182 |
| 6,237,781 B1 * | 5/2001 | Dahl | B62H 3/12 211/17 |
| 6,446,816 B1 * | 9/2002 | Miller | B62H 3/12 211/5 |

(Continued)

*Primary Examiner* — Hiwot E Tefera
(74) *Attorney, Agent, or Firm* — Integrity Patent Group, PLC; Charles E. Runyan

(57) ABSTRACT

A bike hanger system includes a bike hanger assembly having a track-frame, at least one roller, and a bike-hook coupled to the at least one roller. The bike-hook is useful for receiving a wheel of a bicycle such that the bicycle is able to be vertically held for storage. Further, the bike hanger assembly includes a way to prevent theft.

15 Claims, 5 Drawing Sheets

(56) References Cited

U.S. PATENT DOCUMENTS

| | | | |
|---|---|---|---|
| 6,719,158 B2 * | 4/2004 | Goldberg | A47G 25/0692 |
| | | | 211/105.1 |
| 7,000,783 B2 | 2/2006 | Webb | |
| 7,604,131 B1 | 10/2009 | Clark et al. | |
| 8,468,745 B2 | 6/2013 | Krause | |
| 8,757,397 B2 | 6/2014 | Shaha et al. | |
| 8,893,899 B1 | 11/2014 | Hund | |
| 2004/0226899 A1 | 11/2004 | Ferron | |
| 2009/0272704 A1 * | 11/2009 | Wu | A47B 81/04 |
| | | | 211/113 |
| 2011/0240572 A1 * | 10/2011 | Kerman | B62H 3/00 |
| | | | 211/20 |
| 2012/0068133 A1 | 3/2012 | Ozarski | |

* cited by examiner

BIKE HANGER SYSTEM AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

FIELD OF THE INVENTION

The present invention relates generally to the field of bicycle storage devices and more specifically relates to a hanging bicycle storage system.

DESCRIPTION OF RELATED ART

A bicycle is pedal-driven vehicle, having two wheels attached to a frame, one behind the other. Bicycles are actively enjoyed recreationally and for transportation. Bicycle storage has long been a challenge while utilizing the most efficient amount of space. They often produce clutter in typical storage options (i.e., garages). Further, many storage solutions are difficult to install and access. These solutions may include awkward stationary hooks, brackets, and pulleys. Therefore, a suitable solution is desired.

U.S. Pat. No. 7,604,131 to John M. Clark, et al. relates to a sliding storage rack. The described sliding storage rack includes a storage rack that can be mounted to the ceiling to allow easy loading and unloading of multiple items, such as bikes. The stored items ride along a longitudinal track which allows a single item, in a row of many, to be removed without disturbing the remaining items.

BRIEF SUMMARY OF THE INVENTION

In view of the foregoing disadvantages inherent in the known bicycle storage art, the present disclosure provides a novel bike hanger system and method. The general purpose of the present disclosure, which will be described subsequently in greater detail, is to provide a bike hanger system for storing and hanging a plurality of bicycles vertically and in parallel relation to each other.

A bike hanger system is disclosed herein. The bike hanger system includes a bike hanger assembly having a track-frame that may include a first-end and a second-end. The track-frame may have a back, a pair of parallel side-walls, and a longitudinal channel integrally formed from a ninety-degree bend of the pair of parallel side-walls in relation to the back. At least one roller may be movably coupled within the longitudinal channel. The at least one roller may include a body having four wheels (more or less may also be used) configured to slideably engage the longitudinal channel, and a threaded aperture configured to receive a bike-hook.

The back of the track-frame may be mountable to a ceiling-joist via fasteners. The bike-hook may be configured to receive a wheel of a bicycle such that the bicycle may be able to be vertically held for storage. Further, the bike hanger system may be configured such that a plurality of bicycles are able to be held vertically in parallel relation to each other via the bike hanger assembly along a horizontal length of the track-frame.

A method of using a bike hanger system is also disclosed herein. The method of using a bike hanger system may comprise the steps of: providing a bike hanger assembly having a track-frame that includes a first-end and a second-end, the track-frame may have a back, a pair of parallel side-walls, and a longitudinal channel integrally formed from a ninety-degree bend of the pair of parallel side-walls in relation to the back, the bike hanger assembly may further have at least one roller movably coupled within the longitudinal channel, the at least one roller may include a body having four wheels configured to slideably engage the longitudinal channel, and a threaded aperture configured to receive a bike-hook. The steps may further include mounting the bike hanger assembly to a ceiling-joist via fasteners, and receiving a wheel of a bicycle on the bike-hook to be vertically held for storage.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a bike hanger system and method, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to a bicycle storage device and more particularly to a bike hanger system and method as used to improve efficient storage of bicycles.

Generally, the present disclosure provides a safe way to store and lock a plurality of bicycles in a garage, basement, shed, etc. Purposed built bike hooks slide along a low-profile ceiling track-frame and rotate freely, making it convenient to position and access the bicycles. The present disclosure may be advantageous in offering a space-saving solution with the convenience of moving the bicycles around to get to other storage areas. It maximizes the use of scarce space by leveraging vertical space. Further, installation and method of using the assembly is made user-friendly.

Figure 1:
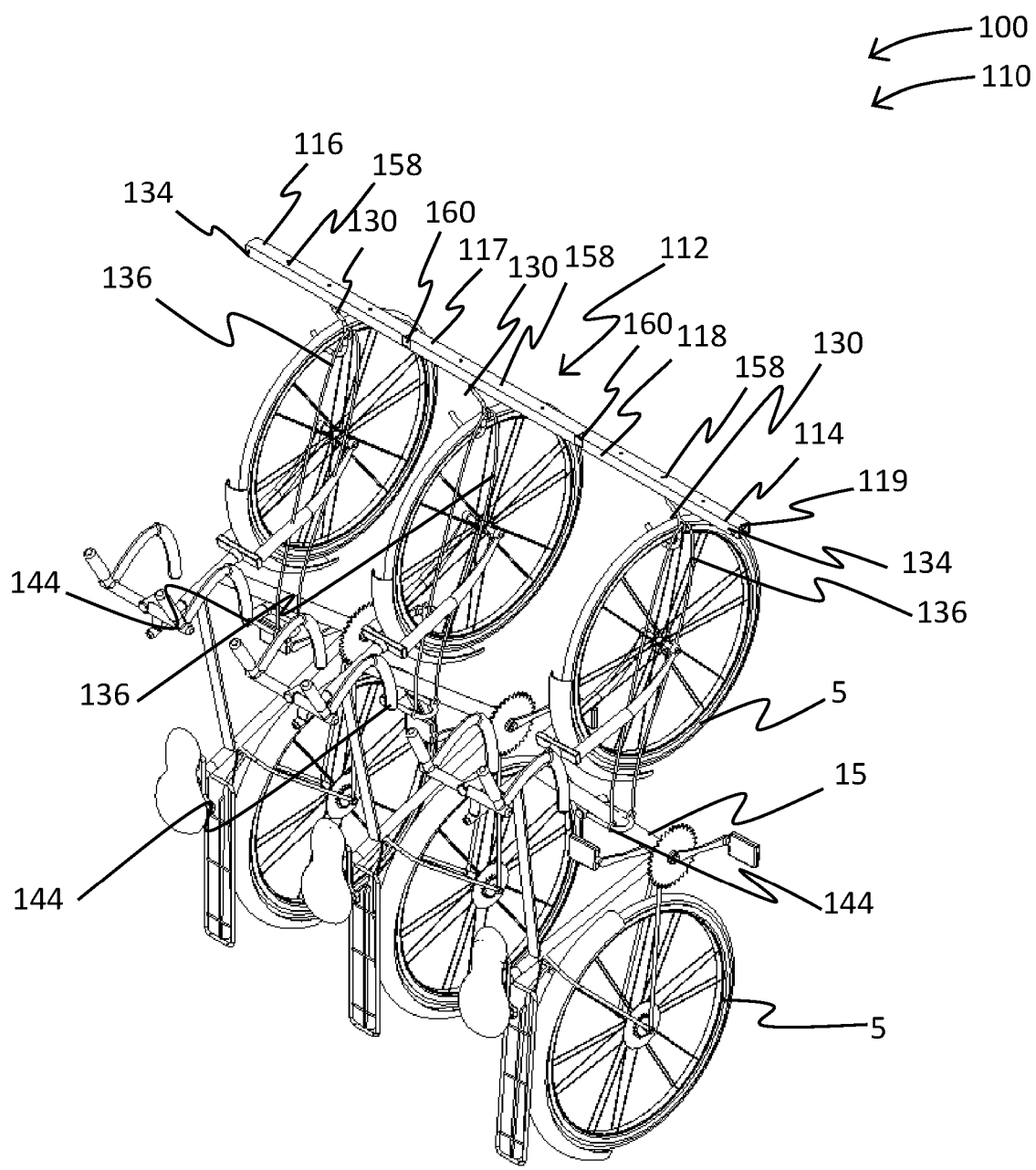
FIG. 1 is a perspective view of the bike hanger system having a bike hanger assembly according to an embodiment of the disclosure.

Referring now more specifically to the drawings by numerals of reference, there is shown in FIGS. 1-4, various views of a bike hanger system 100. FIG. 1 shows the bike hanger system 100 according to an embodiment of the present disclosure. As illustrated, the bike hanger system 100 may include a bike hanger assembly 110 having a track-frame 112 that may include a first-end 114 and a second-end 116. The track-frame 112 may have a back 117, a pair of parallel side-walls 118, and a longitudinal channel 119 integrally formed from a ninety-degree bend of the pair of parallel side-walls 118 in relation to the back 117.

At least one roller 120 may be movably coupled within the longitudinal channel 119. The at least one roller 120 may include a body 122 having four wheels 124 that may be configured to slideably engage the longitudinal channel 119, and a threaded aperture 126 that may be configured to receive a bike-hook 130. The track-frame 112 may further include parallel-holes 134 in the pair of parallel side-walls 118 at the first-end 114 and the second-end 116. The parallel-holes 134 may be configured to receive a pin therethrough, securing the at least one roller 120 within the longitudinal channel 119. The pin may be a cotter pin or other suitable pins. In other embodiments, end-caps may be utilized at the first-end 114 and the second-end 116 of the track-frame 112 for securing the at least one roller 120 within the longitudinal channel 119.

The bike hanger assembly 110 may further include a means for locking and preventing theft of the bicycle(s) 15. The bike-hook 130 may include a ring 138 for threading an elongated-cable 136 therethrough. Further, the elongated-cable 136 may include a loop 142 at each end for attaching a locking-device 144 (i.e., padlock, U-lock, etc.).

The bike-hook 130 may be configured to receive a wheel 5 of the bicycle 15 such that the bicycle 15 is able to be vertically held for storage. Either the front or the back wheel 5 of the bicycle 15 may be utilized. The bike hanger system 100 may be configured such that a plurality of bicycles 15 are able to be held vertically in parallel relation to each other via the bike hanger assembly 110 along a horizontal length 132 of the track-frame 112. In one embodiment, the back 117 of the track-frame 112 may be mountable to a ceiling-joist via fasteners. Across the horizontal length 132 of the back 117, a plurality of slots 158 may be included and configured to accommodate the fasteners. The fasteners may include but not limited to screws (i.e. lag screws) and brackets. Brackets may be used in yet another embodiment to allow the bike hanger system 100 to be utilized on a planar surface other than the ceiling-joist. The horizontal length 132 may be approximately 2 to 3 feet.

According to one embodiment, the bike hanger system 100 may be arranged as a kit. The kit may include bike hanger assembly 110. The instructions may detail functional relationships in relation to the structure of the bike hanger system 100 (such that the bike hanger system 100 can be used, maintained, or the like, in a preferred manner).

Upon reading this specification, it should be appreciated that, under appropriate circumstances, considering such issues as user preferences, design preference, structural requirements, marketing preferences, cost, available materials, technological advances, etc., other arrangements for the bike hanger assembly 110 such as, for example, structural configurations, etc., may be sufficient.

Figure 2:
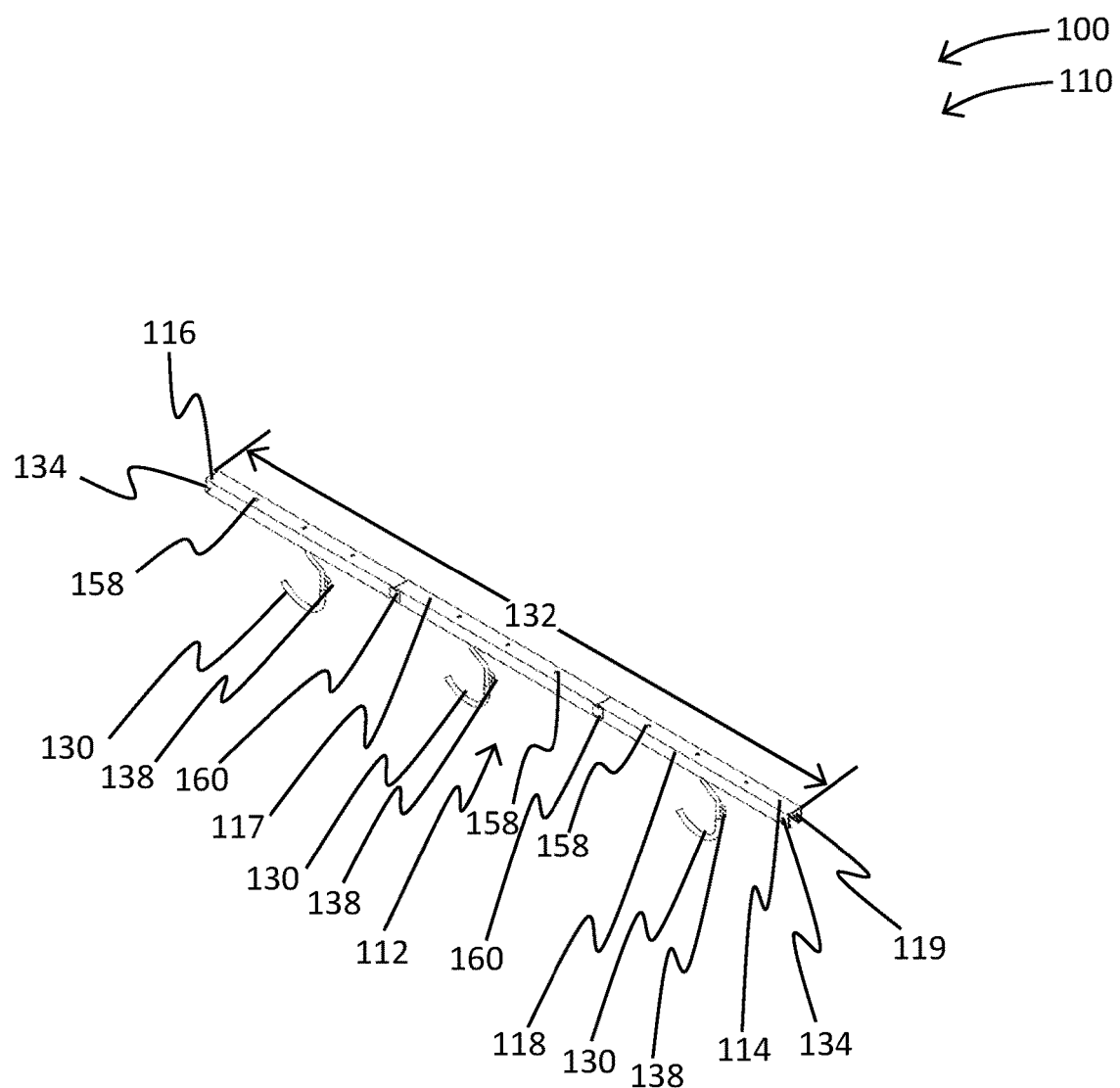
FIG. 2 is a perspective view of the bike hanger system of FIG. 1, according to an embodiment of the present disclosure.

FIG. 2 shows a perspective view of the bike hanger system 100 of FIG. 1, according to an embodiment of the present disclosure. As above, the bike hanger system 100 may include the bike hanger assembly 110 having the track-frame 112 that may include the first-end 114 and the second-end 116. The track-frame 112 may have the back 117, the pair of parallel side-walls 118, and the longitudinal channel 119 integrally formed from the ninety-degree bend of the pair of parallel side-walls 118 in relation to the back 117.

In one embodiment, the bike hanger system 100 may be modular. The track-frame 112 may include a joining-mechanism 160 on the pair of parallel side-walls 118 at one of the first-end 114 or the second-end 116 enabling the bike hanger assembly 110 to be used with one or more of the track-frames 112. The joining-mechanism 160 may include a clip or other suitable joining device to connect the track-frames 112. The joining-mechanism 160 may be on the pair of parallel side-walls 118 thus not interfering with the at least one roller 120. The present embodiment may be advantageous in increasing or decreasing the horizontal length 132 to accommodate a variety of room sizes. Further, the present embodiment may allow for a more convenient and less expensive packaging and shipping arrangement.

The at least one roller 120 may be movably coupled within the longitudinal channel 119. The at least one roller 120 may include the body 122 having four wheels 124 that may be configured to slideably engage the longitudinal channel 119, and the threaded aperture 126 may be configured to receive the bike-hook 130. The track-frame 112 may further include parallel-holes 134 in the pair of parallel side-walls 118 at the first-end 114 and the second-end 116. The parallel-holes 134 may be configured to receive the pin therethrough, securing the at least one roller 120 within the longitudinal channel 119.

Figure 3:
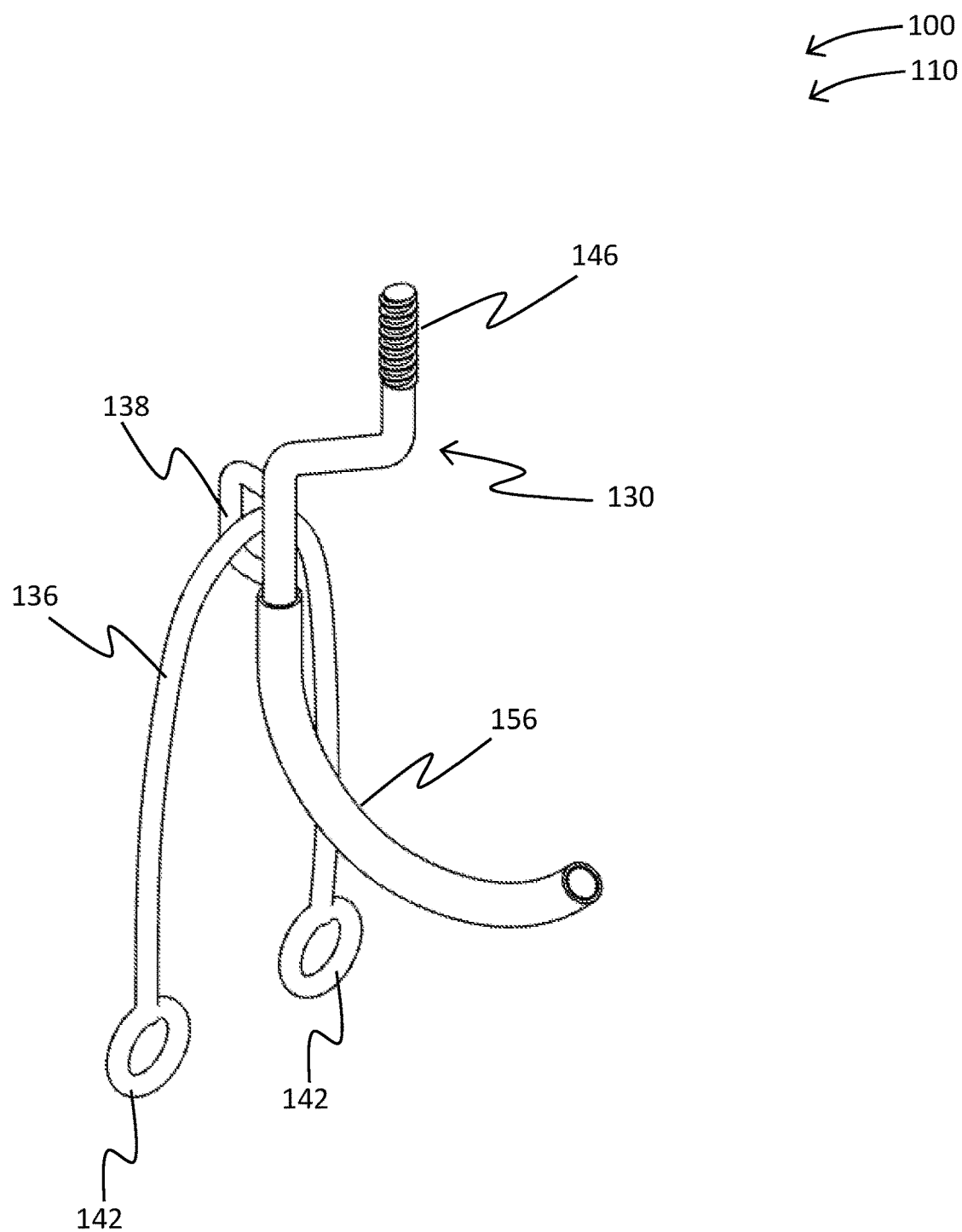
FIG. 3 is a perspective view of a bike-hook of FIG. 1, according to an embodiment of the present disclosure.

FIG. 3 shows a perspective view of the bike-hook 130 of FIG. 1, according to an embodiment of the present disclosure. As above, the bike hanger system 100 may include the bike-hook 130. The bike-hook 130 may include a threaded shaft 146 that is configured to be inserted through the threaded aperture 126. The threaded shaft 146 may include a thread that is approximately 8 mm. Further, the bike-hook 130 may include the ring 138 for threading the elongated-cable 136 therethrough. The elongated-cable 136 may include the loop 142 at each end for attaching the locking-device 144 (i.e., padlock, U-lock, etc.). In one embodiment, the locking-device 144 may be integral to the loop 142, prohibiting the locking-device 144 to be removeable.

The bike-hook 130 may comprise a polyvinyl chloride (PVC) resin coating for preventing damage to the bicycle 15. The bike-hook 130 may include a cover 156 comprising an elastic polymeric substance (or the like) to further protect the bicycle 15 when holding the wheel 5 of the bicycle 15, and to protect the polyvinyl chloride (PVC) resin coating on the bike-hook 130. The cover 156 may be removeable from the bike-hook 130. In one embodiment, the bike-hook 130 may be is geometrically optimized (i.e., wide-mouth), such that the bike-hook 130 may better accommodate the wheel 5 of the bicycle 15, particularly for a larger sized wheel 5.

Figure 4:
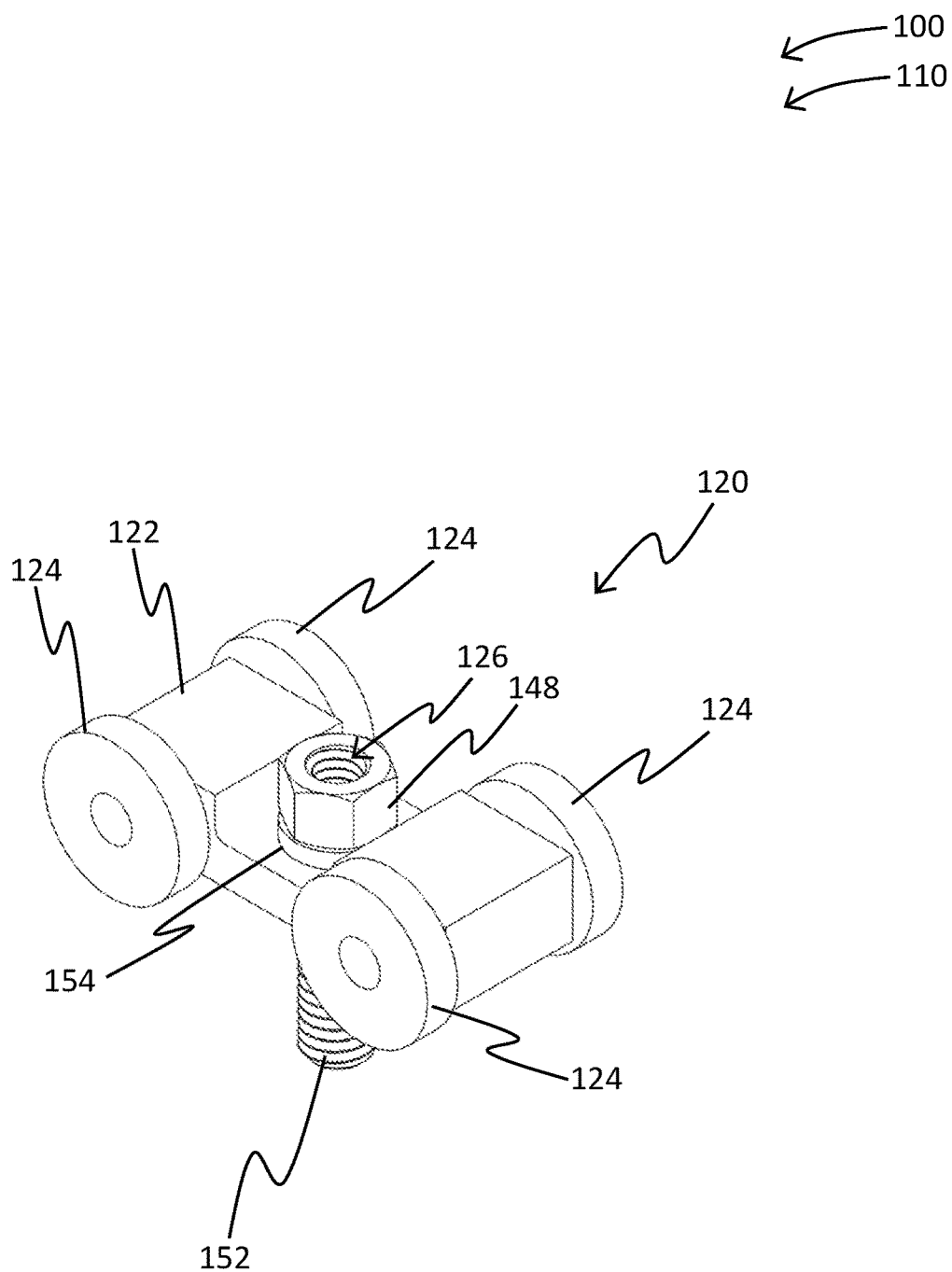
FIG. 4 is a perspective view of at least one roller of FIG. 1, according to an embodiment of the present disclosure.

FIG. 4 shows a perspective view of the at least one roller 120 of FIG. 1, according to an embodiment of the present disclosure. As above, the bike hanger system 100 may include the at least one roller 120 that may be movably coupled within the longitudinal channel 119. The at least one roller 120 may include the body 122 having four wheels 124 that may be configured to slideably engage the longitudinal channel 119, and the threaded aperture 126 which may be configured to receive the bike-hook 130. The threaded aperture 126 may comprise a lug nut 148 coupled to the body 122 via a threaded bolt 152 therethrough the threaded aperture 126. The threaded bolt 152 and a washer 154 may be attachable to the lug nut 148 enabling the bike-hook 130 to be rotatable 360 degrees. The threaded bolt 152 and the washer 154 may allow for easy removal and replacement of the bike-hook 130, and allowing for different designed hooks to be utilized.

Figure 5:
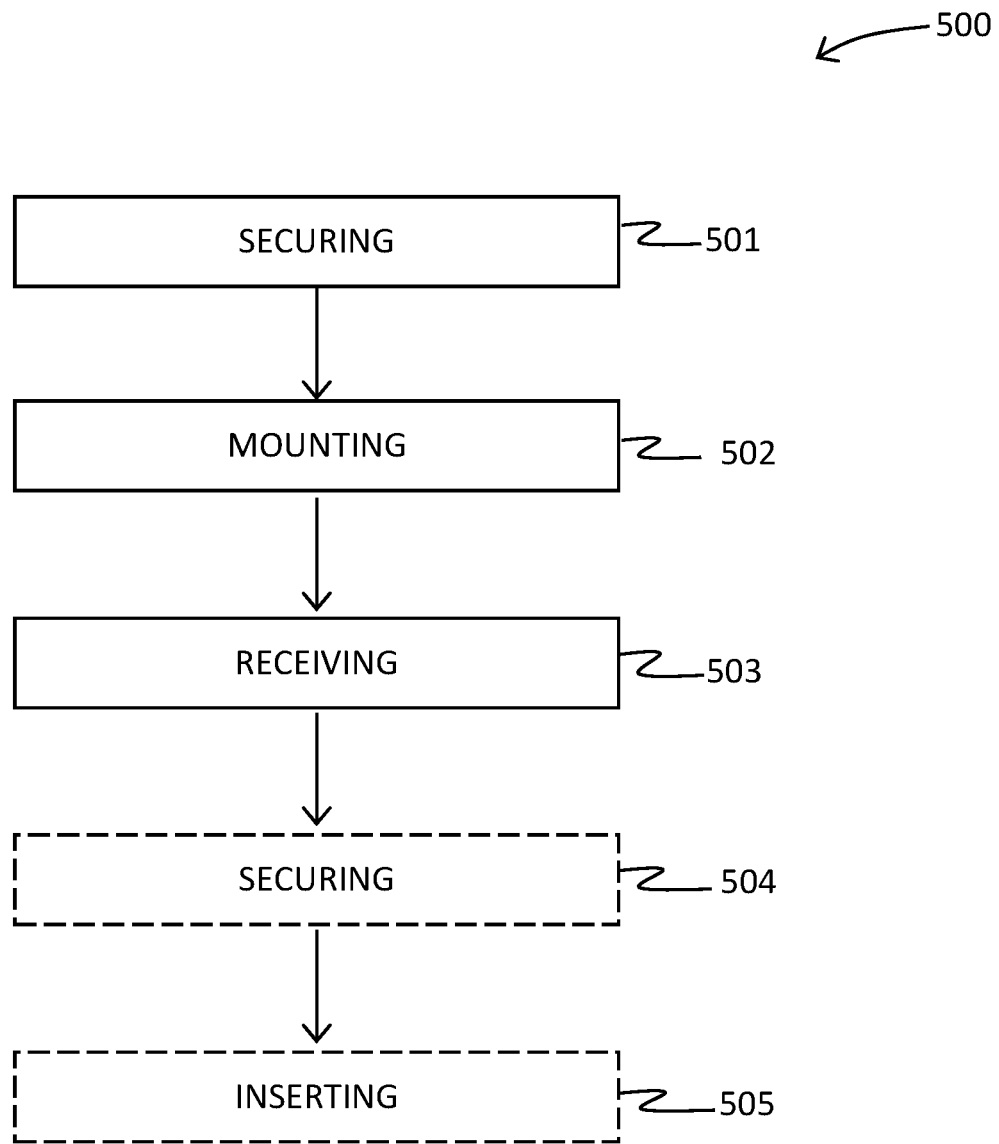
FIG. 5 is a flow diagram illustrating a method of using the bike hanger system, according to an embodiment of the present disclosure.

FIG. 5 is a flow diagram 550 illustrating a method of using 500 a bike hanger system 100, according to an embodiment of the present disclosure. As illustrated, the method of using 500 the bike hanger system 100 may include the steps of: step one 501, providing the bike hanger assembly having the track-frame including the first-end and the second-end, the track-frame having the back, the pair of parallel side-walls, and the longitudinal channel integrally formed from the ninety-degree bend of the pair of parallel side-walls in relation to the back, the bike hanger assembly further having at least one roller movably coupled within the longitudinal channel, the at least one roller including the body having, four wheels configured to slideably engage the longitudinal channel, and the threaded aperture configured to receive the bike-hook; step two 502, mounting the bike hanger assembly to the ceiling-joist via fasteners; step three 503, receiving the wheel of the bicycle on the bike-hook to be vertically held for storage; step four 504, securing the elongated-cable through the bicycle, the elongated-cable having the loop at each end; and step five 505, inserting the locking-device through the loop at each end of the elongated-cable.

It should be noted that step four 504 and step five 505 are optional steps and may not be implemented in all cases. Optional steps of method of use 500 are illustrated using dotted lines in FIG. 5 so as to distinguish them from the other steps of method of use 500. It should also be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for bike hanger system 100 (e.g., different step orders within above-mentioned list, elimination or addition of certain steps, including or excluding certain maintenance steps, etc.), are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A bike hanger system, the system comprising:
    a bike hanger assembly having;
        a track-frame including a first-end and a second-end, said track-frame having a back, a pair of parallel side-walls, and a longitudinal channel integrally formed from a ninety-degree bend of said pair of parallel side-walls in relation to the back,
        at least one roller movably coupled within said longitudinal channel, said at least one roller including a body having,
            four wheels configured to slideably engage said longitudinal channel,
            a threaded aperture configured to receive a bike-hook, said threaded aperture comprising a lug nut coupled to said body and attachable to a threaded bolt and a washer enabling said bike-hook to be rotatable 360 degrees;
    wherein said back of said track-frame is mountable to a ceiling-joist via fasteners;
    wherein said bike-hook is configured to receive a wheel of a bicycle such that said bicycle is able to be vertically held for storage; and
    wherein said bike hanger system is configured such that a plurality of bicycles are able to be held vertically in parallel relation to each other via said bike hanger assembly along a horizontal length of said track-frame.

2. The bike hanger system of claim 1, further comprising parallel-holes in said pair of parallel side-walls at said first-end and said second-end of said track-frame; and
    wherein said parallel-holes are configured to receive a pin therethrough, securing said at least one roller within said longitudinal channel.

3. The bike hanger system of claim 2, wherein said pin is a cotter pin.

4. The bike hanger system of claim 1, wherein said bike-hook includes a ring for threading an elongated-cable therethrough.

5. The bike hanger system of claim 4, wherein said elongated-cable includes a loop at each end for attaching a locking-device.

6. The bike hanger system of claim 1, wherein said bike-hook includes a threaded shaft that is configured to be inserted through said threaded aperture.

7. The bike hanger system of claim 6, wherein said threaded shaft includes a thread that is approximately 8 mm.

8. The bike hanger system of claim 1, wherein said bike-hook comprises a polyvinyl chloride (PVC) resin coating.

9. The bike hanger system of claim 1, wherein said bike-hook further includes a cover comprising an elastic polymeric substance.

10. The bike hanger system of claim 1, wherein across said horizontal length of said back includes a plurality of slots configured to accommodate said fasteners.

11. The bike hanger system of claim 1, wherein said fasteners includes screws.

12. The bike hanger system of claim 1, wherein said horizontal length is approximately 2 to 3 feet.

13. The bike hanger system of claim 1, wherein said track-frame includes a joining-mechanism on said pair of parallel side-walls at one of said first-end and alternately said second-end enabling said bike hanger assembly to be used with one or more of said track-frames.

14. A bike hanger system, the system comprising:
    a bike hanger assembly having;
        a track-frame including a first-end and a second-end, said track-frame having a back, a pair of parallel side-walls, and a longitudinal channel integrally formed from a ninety-degree bend of said pair of parallel side-walls in relation to the back;
        at least one roller movably coupled within said longitudinal channel, said at least one roller including a body having;

four wheels configured to slideably engage said longitudinal channel, and
a threaded aperture configured to receive a bike-hook;

wherein said back of said track-frame is mountable to a ceiling-joist via fasteners;

wherein said bike-hook is configured to receive a wheel of a bicycle such that said bicycle is able to be vertically held for storage;

wherein said bike hanger system is configured such that a plurality of bicycles are able to be held vertically in parallel relation to each other via said bike hanger assembly along a horizontal length of said track-frame;

further comprising parallel-holes in said pair of parallel side-walls at said first-end and said second-end of said track-frame;

wherein said parallel-holes are configured to receive a pin therethrough, securing said at least one roller within said longitudinal channel;

wherein said pin is a cotter pin;

wherein said bike-hook includes a ring for threading an elongated-cable therethrough;

wherein said elongated-cable includes a loop at each end for attaching a locking-device;

wherein said bike-hook includes a threaded shaft that is configured to be inserted through said threaded aperture;

wherein said threaded shaft includes a thread that is approximately 8 mm;

wherein said threaded aperture comprises a lug nut coupled to said body;

wherein said lug nut is attachable to a threaded bolt and a washer enabling said bike-hook to be rotatable 360 degrees;

wherein said bike-hook comprises a polyvinyl chloride (PVC) resin coating;

wherein said bike-hook further includes a cover comprising an elastic polymeric substance;

wherein across said horizontal length of said back includes a plurality of slots configured to accommodate said fasteners;

wherein said fasteners includes screws;

wherein said horizontal length is approximately 2 to 3 feet; and wherein said track-frame includes a joining-mechanism on said pair of parallel side-walls at one of said first-end or said second-end enabling said bike hanger assembly to be used with one or more of said track-frames.

15. The bike hanger system of claim 14, further comprising set of instructions; and
wherein the bike hanger system is arranged as a kit.

* * * * *